United States Patent [19]
Carlson

[11] 3,913,680
[45] Oct. 21, 1975

[54] CONTROL SYSTEM FOR PERCENTAGE OF WHEEL SLIPPAGE OF A TRACTOR

[75] Inventor: Richard G. Carlson, Greendale, Wis.

[73] Assignee: Allis-Chalmers Corporation, Milwaukee, Wis.

[22] Filed: May 30, 1974

[21] Appl. No.: 474,674

Related U.S. Application Data
[62] Division of Ser. No. 300,715, Oct. 25, 1972, Pat. No. 3,834,481.

[52] U.S. Cl. .............. 172/2; 37/DIG. 1; 303/21 BE; 303/21 P; 317/6; 324/161
[51] Int. Cl.² ..................................... A01B 41/06
[58] Field of Search ..................... 172/2, 3, 7, 9, 10; 324/161; 180/77 R, 103, 105 E; 303/21 P, 21 EB, 21 BE; 317/5, 6; 37/DIG. 1

[56] References Cited
UNITED STATES PATENTS

| | | | |
|---|---|---|---|
| 2,654,301 | 10/1953 | Bohmker | 172/2 |
| 2,927,649 | 3/1960 | Poynor et al. | 172/2 |
| 3,060,602 | 10/1962 | Buttenhoff | 172/2 X |
| 3,064,371 | 11/1962 | Kutzler | 180/77 R X |
| 3,401,983 | 9/1968 | Reid, Jr. | 303/21 BE |
| 3,477,152 | 11/1969 | Ask | 172/2 X |
| 3,582,152 | 6/1971 | Burckhardt et al. | 303/21 EB |
| 3,653,727 | 4/1972 | Kullberg et al. | 303/21 P |
| 3,701,568 | 10/1972 | Lewis et al. | 303/21 P |
| 3,776,322 | 12/1973 | Misch et al. | 172/2 |
| 3,803,574 | 4/1974 | Logue | 172/2 X |
| 3,809,956 | 5/1974 | Burkel et al. | 324/161 X |

*Primary Examiner*—Clifford D. Crowder
*Attorney, Agent, or Firm*—Arthur L. Nelson

[57] ABSTRACT

Apparatus for determining the percentage of wheel slippage of the drive wheel of a tractor and using a hydraulic weight distribution system to distribute the weight of the tractor and maintain a desired percentage of wheel slippage, preferably 12–15 percent. A signal from a signal generator on a freely rotatable wheel is compared to a signal from a signal generator connected to a drive wheel to obtain a difference signal which is then compared with the signal from the signal generator connected to the drive wheel to obtain percentage of wheel slippage. This actual percentage is compared with a signal from a potentiometer set to represent a desired percentage slip and the resultant signal is used to control hydraulic actuators to raise and lower the three point hitch and connected implement to maintain a desired percentage of wheel slippage.

10 Claims, 3 Drawing Figures

CONTROL SYSTEM FOR PERCENTAGE OF WHEEL SLIPPAGE OF A TRACTOR

This is a divisional application of my application Ser. No. 300,715, filed Oct. 25, 1972 now U.S. Pat. No 3,834,481.

This invention relates to a weight distribution system and more particularly to a drive wheel sensor and control for regulating wheel slippage in combination with hydraulic weight distribution system on a draft vehicle.

A number of control systems have been used in combination with soil working vehicles and combination tractor and implement units for controlling the work load on the tractor in response to the load sensed by the tractor. A common system of such type is the position and draft load control system which senses draft load and automatically controls the implement depth through the hydraulic weight distribution system. The conventional systems raise or lower the implement in response to an increase or decrease in draft loads. However, different soils have different draft requirements per unit cross section area and the operator usually encounters different types of soil while traveling over the length of the field. Accordingly, this often requires that the operator change the setting of the draft control system to accommodate the varying soil conditions. Even with a multiple control system which might sense draft load conditions, engine speed, throttle control, and various other parameters a system might be devised which becomes extremely complicated and does not necessarily provide the ultimate in efficiency of the tractor implement combination in the field. The selection of the implement position and its control mode, engine drive, wheel speed ratio and engine governor control setting is left to the judgment of the operator. Even with an experienced operator, it is not always possible to gain the maximum efficiency out of such a tractor implement combination and, a complicated system to feed in all these parameters into one system would get rather expensive.

Accordingly, this invention deals with a system which would not place great demands on the operator and which controls the slippage of the rear wheels. This is near ideal in that for virtually all types of soil conditions, maximum tractive power efficiency is obtained at 12% to 15% wheel slip. For the best results, an infinitely variable input-output ratio should be available at the transmission of the tractor. This implies the use of a power train with infinitely varying speed ratios such as electric, hydrostatic, hydrokinetic, hydromechanical power train units. A device relating to this type of power train will be described in the following.

It has been determined that the slippage of the rear wheels of a draft vehicle for maximum efficiency is in the range of 12% to 15%. For example, when considering apparent normal working speeds for a tractor-implement combination of 4 miles per hour, the actual working speed would be 3.4 miles per hour with 15% slippage. To maintain slippage limits within limits of ± 10% from reference of 15% slippage, the actual travel velocity may vary from 3.34 to 3.46 with constant input wheel angular velocity. It is understood, however, that a control is provided to monitor the slippage rate to any desired slippage selected by the operator. Accordingly, the automatic control for slippage would automatically maintain the slippage within predetermined limits.

It is an object of this invention to provide a drive wheel slip sensor and control on a drive vehicle.

It is another object of the invention to provide a drive wheel slip sensor and control for operating in conjunction with the weight distribution system on a draft vehicle.

It is a further object of this invention to provide a drive wheel slip sensor for regulating a predetermined wheel slip and operating in conjunction with the hydraulic weight distribution system on a draft vehicle.

It is a further object of this invention to provide a sensor sensing average angular wheel velocity for a freely rotatable wheel and comparing this velocity to the average angular velocity of a drive wheel to determine wheel slippage for controlling a weight distribution system.

The objects of this invention are accomplished by providing a sensor to sense angular velocity of front wheel rotation and angular velocity of the rear drive wheel rotation with a comparator for comparing their angular velocities. A second comparator compares the different signal with the original drive wheel signal to provide a percentage slip signal which in turn is compared with a voltage signal with the resultant signal being applied to electrically operated valves to operate the hydraulic weight distribution system. The weight distribution system operates in response to variations in wheel slippage to a preset maximum slip to raise and lower the implement. The preset maximum slippage is maintained at a substantially constant rate within predetermined limits of implement working position.

Referring to the drawings, FIG. 1 illustrates a three dimensional view of a tractor with the various components positioned on the tractor for operation in the wheel slippage system.

Figure 1:
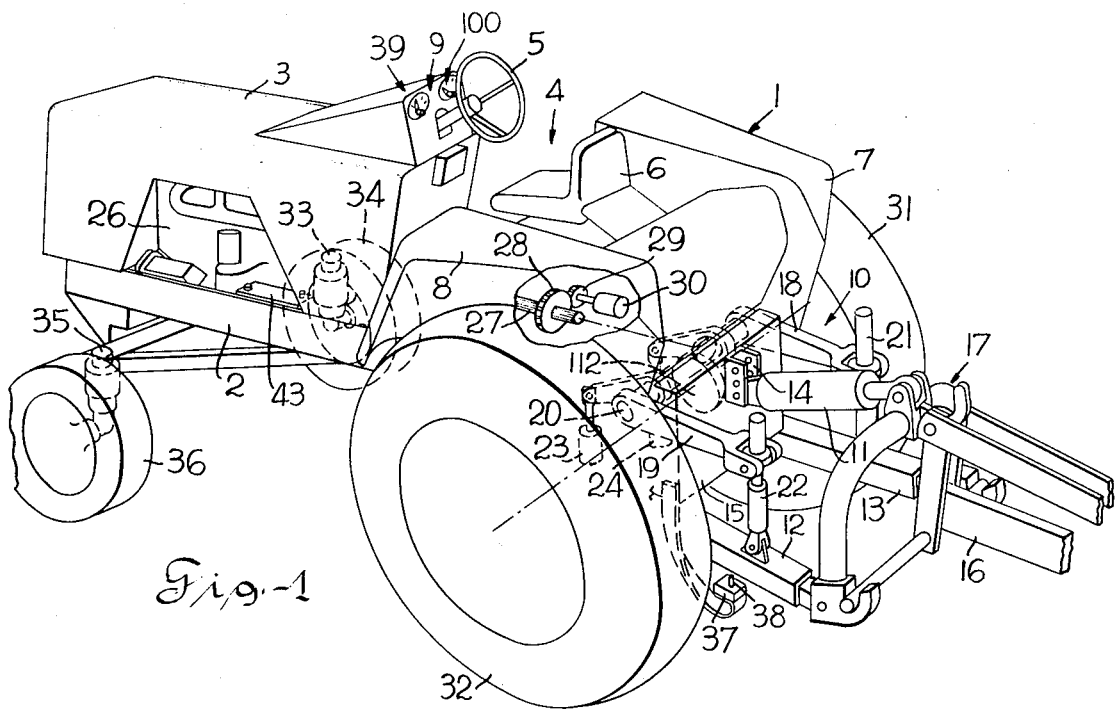
Figure 3:
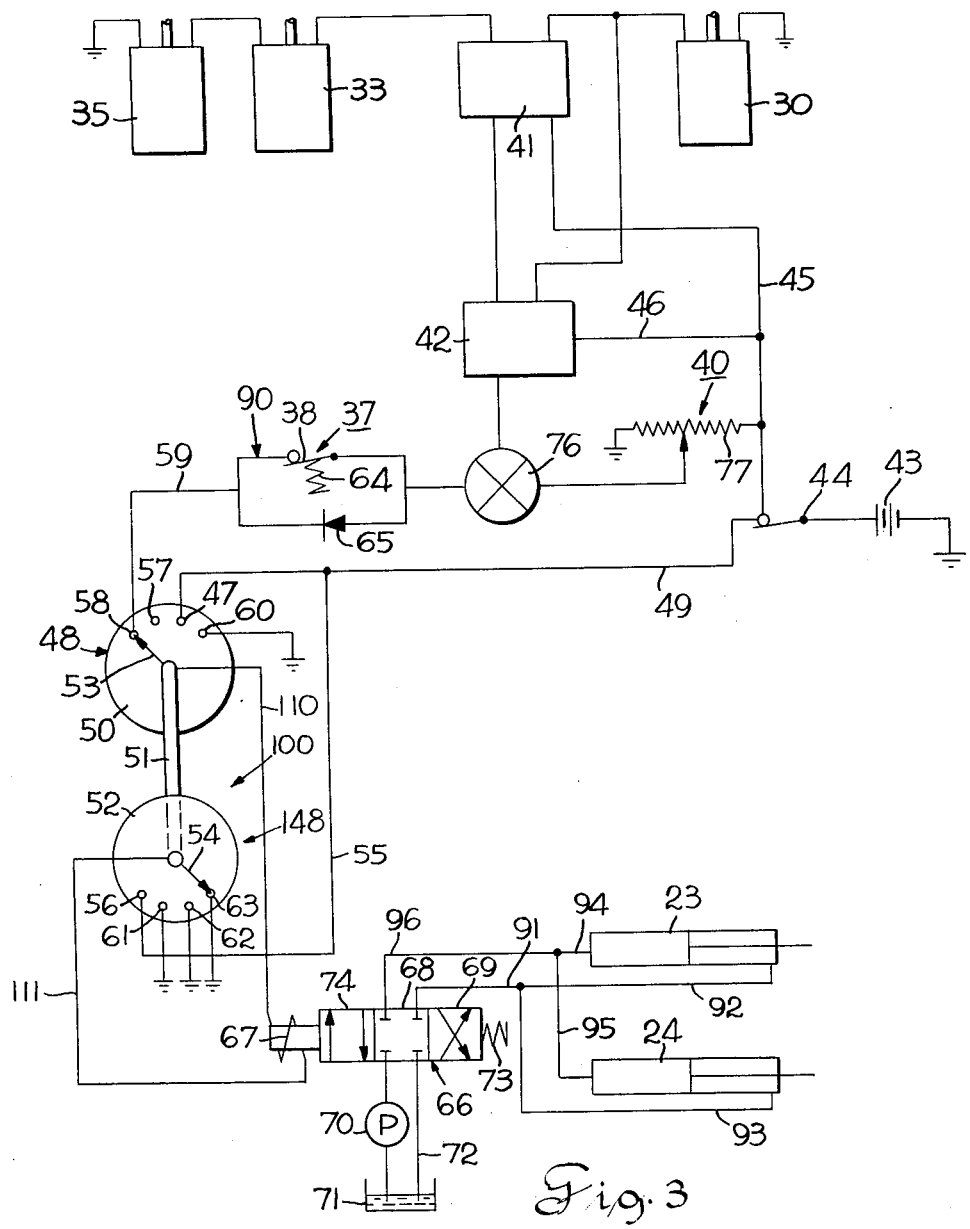
FIG. 3 is a schematic diagram of the wheel sensing system for controlling the weight distribution system.

FIG. 1 illustrates a tractor 1 having a vehicle chassis 2 supporting an engine hood 3. The operator station 4 is defined by steering wheel 5, seat 6, the fenders 7 and 8 and the instrument panel 9. A three point hitch 10 is mounted on the rear end of the tractor and includes upper link 11 and two lower draft arms 12 and 13. The upper link 11 is connected to a bracket 14 on the rear drive housing 15. The lower draft arms are connected by suitable means to the underside of the vehicle chassis. The implement 16 is connected to the hitch adapter 17 which is connected to the upper link 11 and the lower draft arms 12 and 13. The rock arms 18 and 19 are connected through a rockshaft 20 to pivot on the axis of the rockshaft. The lift links 21 and 22 are connected from the rock arms 18 and 19 to the lower draft arms 13 and 12 for lifting and lowering the draft arms and the implement 16. The hydraulic actuators 23 and 24 operate to rotate the rockshaft in response to the slippage signal sensed from the sensing system which is shown in FIG. 3. The tractor 1 is driven by an engine 26 driving through a transmission and the propeller shaft 27. Propeller shaft 27 drives the rear wheels 31 and 32 through the differential 112. A suitable gear 28 drives a gear 29 which is connected to a signal generator (or pair of generators) 30 for sensing average angular velocity of the wheel 31 and 32. Signal generator 33 senses wheel rotation of front wheel 34 while the signal generator 35 senses wheel rotation of front wheel 36. The limit switch 37 is supported on the chassis and mounted immediately below the draft arm 12. The switch arm 38 engages the underside of the draft arm 12 when the draft arm 12 is pivoted downwardly to a predetermined point and thereby opening the switch 37.

A slippage potentiometer 40 is positioned in back of the dial of the monitor 39 which is indicated on the instrument panel 9 for selecting a predetermined percentage of slip between the front wheels and rear wheels. A signal from the potentiometer is compared with the slippage signal to control the weight distribution system for raising or lowering the draft arms 12 and 13.

Referring to FIG. 3, the signal generator 35 and signal generator 33 are connected in series with signal generator 35 connected to ground. The output of the signal generator 33 and 35 is connected to the signal comparator 41.

A signal generator 30 is connected to ground and connected on its output side to the signal comparator 41. The signal comparator 41 is connected to comparator 42. The signal generator 30 is also connected on its output side to the signal comparator 42. The battery 43 is connected to ground and through the switch 44, conductors 45 and 46 to the signal comparators 41 and 42 respectively. The battery is connected to the terminal 47 of the switch section 48 through conduit 49.

Wafer 50 supports the terminal 57 which is an open terminal. Terminal 58 is connected to conductor 59 of the slippage control circuit. Contact 60 is connected to ground. When the contact arm 53 is rotated it selectively contacts terminals 58, 57, 47 and 60.

The switch arm 53 of switch section 48 is carried on insulator shaft 51 which is rotatably supported on wafers 50 and 52. Switch arm 53 is connected to conductor 110. Switch arm 53 engages terminals on the switch section 48 and the switch arm 54 engages terminals on switch section 148. Switch arm 54 is connected to conductor 111. The conductor 49 is connected through conductor 55 to terminal 56 on the switch section 148. The lower wafer 52 supports the contacts 61, 62 and 63 which are all connected to ground.

The switch 37 is in parallel with the diode 65 and is normally biased to a closed position by the spring of 64. Diode 65 permits current flow through the selector switch 100 only for raising of the draft arm. Effectively, the switch 37 is a safety switch limiting the depth of the implement and the low position of the draft arm 12 and 13.

The solenoid operated hydraulic valve 66 includes a solenoid coil 67 which is selectively energized for raising and lowering of the draft arms 12 and 13. The hydraulic valve includes intermediate section 68 which blocks the flow of hydraulic fluid. The valve 66 also includes a right hand section 69 for supplying pressurized fluid to the rod end of the hydraulic cylinders 23 and 24 which in turn lowers the draft arms 12 and 13. The pressurized fluid is supplied by the pump 70 which receives fluid from the reservoir 71 and fluid returns to the reservoir 71 by conduit 72. The valve 66 is operated when coil 67 of valve 66 is energized and spring 73 normally returns the solenoid valve to a neutral position as shown when the coil is de-energized.

When the current is supplied to the solenoid coil 67 in a reverse direction the section 74 supplies pressurized fluid to the base ends of the cylinders 23 and 24 which in turn expands the cylinders and lowers the draft arms 12 and 13 producing an increased depth of the implement.

The sensing circuit includes signal comparators 41 and 42 and the output signal from the comparator 42 is a precentage slip signal. The percentage slip signal is compared in the comparator 76 with the signal from the slip potentiometer 40. The output signal from the summer 76 is applied through the switch 37 of the parallel circuit of the switch 37 and the diode 65 to control the operation of the solenoid valve 66.

Figure 2:
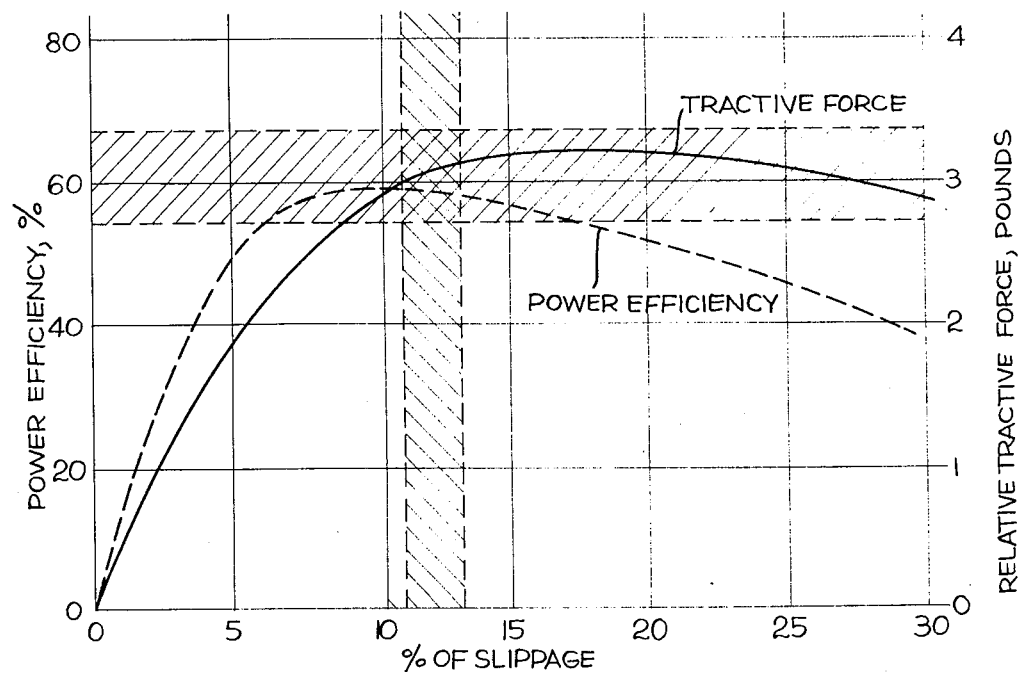
FIG. 2 is a graph illustrating power efficiency with respect to percentage of wheel slippage.

Referring to FIG. 2, the chart illustrates power efficiency and tractive force in pounds relative to percentage of slippage. The power efficiency is indicated by the dotted line while the tractive force is indicated by the solid line. Assuming it is desirable to operate at 95% of maximum draft load which corresponds to a 12.0% for the soil used in obtaining the results shown in FIG. 2. If draft load is controlled within plus or minus 10% of the desired setting the system can operate below 40% power efficiency once maximum draft is bypassed. However, if percentages were controlled plus or minus 10% with respect to the reference slippage minimum power efficiency would be 58.2% compared to a maximum of 59.3% for the particular tire soil combination represented. Furthermore, if the percent slip were in error plus or minus 25% relative to the hypothetical desirable setting which produces 95% of maximum draft, power efficiency would only drop to 56.8%, for example. This range is shown on the chart by a shaded area indicated with relation to the 95% of maximum draft force.

As shown in FIG. 2, it is apparent that in a region of maximum power efficiency, slippage feedback information would be more desirable than draft load feedback information. This desirability is further accentuated in that a single percent slip setting would suffice for nearly all soil conditions, while the allowable draft varies with soil conditions and, in some cases, the present draft control systems need a manual readjustment in a single pass through a field with widely varying soil types and conditions.

With present gear train drives, a slippage position control system could very well produce stalling. This condition would occur if draft needed to produce the maximum percent slip while operating in a particular gear resulted in power requirements exceeding the capabilities of the engine. If the constant speed ratio gear train is to be retained, a slippage feedback control would certainly need to be used in combination with the engine RPM and governor control setting information to prevent stalling. However, with the infinitely variable transmission speed ratios, slippage feedback could be used as a single indication of vehicle-soil interface efficiency and engine transmission control could adjust input-output speed ratios to prevent stalling of the engine, a much more desirable condition if an overall efficiency measures such as dollars per acre, fuel per acre, time per acre and total cost per acre are to be considered. The chart shown in FIG. 2 is taken from the "Model Studies of Single and Dual Powered Wheels" by S. J. Clark and J. B. Liljedahl.

The drive wheel sensing system and the weight distribution system will be described in the following paragraphs.

The signal generators 33 and 35 are attached to the front wheel assemblies 34 and 36 of the tractor in series so that an average longitudinal center velocity of the front end of the vehicle is indicated. By using the front wheel units contour operation and turning operations are compensated for reasonably well.

A similar signal generator 30 is mechanically driven by the final drive 27 of the tractor power train indicating the average drive wheel velocity. By appropriate choice of the driving gear ratios for the front wheel and rear wheel generators a balanced design can be obtained whereby the sum of the signal from the front generators and the rear generator is zero for zero slip irrespective of the tractor travel speed. This summing is performed by the differential transistor amplifier 41.

To operate at a given percent drive wheel slippage the travel velocity signal must be used in two ways. For the direct comparison as discussed above, plus as the input to the second differential transistor amplifier 42 to increase the second relative output with respect to the indicated difference in front and rear output. For example, at 1 mile per hour at 15%, the voltage difference between the front and rear may be perhaps 0.5 volts while for the operation at 3 miles per hour at the same percentage slip, the output voltage difference for 41 would be 1.5 volts. Thus by use of the second comparator unit 42 the second differential voltage will be used to give the final output which will be proportional to the front and rear wheel speeds. At this stage a zero offset potentiometer 40 with the monitor dial 39 calibrated in percent slip can be used as a reference signal generator to set the operational percent slip, with the final signal being supplied to the control valve. An increase in slippage will cause the total signal to the valve 66 to become positive with the resultant raising of the implement through the weight transfer system. With less than optimum slippage a diode 65 with switch 37 can be used to lower the implement 16 to a given level at which time no further lowering takes place due to positive feedback.

A parallel circuit between the valve 66 and voltage summer 76 will provide travel limit required. In the normal operating range normally switch 37 mounted below the lift arm 12 will provide raising and lowering capability. However, once the normally closed switch 37 is contacted by the draft arm 12 and opened, any communication with the valve from the signal generating system must be through diode 65 which blocks any lowering current but passes a current of opposite polarity which corresponds to a raised signal. Thus whenever the lift arm is off the lower limit, normal slippage implement control results. If the lift arm is set at the lower limit of the travel, only upward movement of the lift arms through the cylinder 23 and 24 will be possible when and if slippage exceeds preset values.

The above basic concepts can be utilized in similar manners to regulate depth of cut for self-loading scrapers to keep drive wheel slippage to a minimum and to regulate oil flow in a tractor loader torque-converter to keep the energy dissipation to a minimum when a work pile is approached and engaged.

In normal operation the operator selects the desired percentage of slip with the aid of calibrated face of the potentiometer 40. Implement 16 will be raised and lowered automatically whenever slippage signal into the summer 76 increases and decreases from the null balance value needed to balance input from the control potentiometer 40. If the implement 16 is lowered until the draft arm 12 contacts the normally closed switch 37, only an overslip signal will activate the valve 66 and then in the lifting mode. Once the normal switch has been closed again, the implement position will be maintained at the operator set slippage level.

The signal generators 33 and 35 are additive and the total signal is compared with the signal of signal generator 30 in the comparator 41. The output signal of the signal comparator 41 is applied to the second signal comparator 42 which also receives the signal from the signal generator 30.

The output signal from comparator 41 is equal to the difference of the two signals which is then applied to the comparator 42. The comparator 42 compares the difference signal from comparator 41 with the signal from the signal generator 30. In other words, a percentage slip signal is generated at the output from the comparator 42. This signal is then compared with the signal from the slippage potentiometer 40 and if the signals are equal, no signal is transmitted through the parallel circuit 90. Assuming that the circuit operates within a range of plus or minus 10% of a preset voltage of the potentiometer 40 when a slippage signal from comparator 42 is greater than 10% of the setting of the monitor signal 40, the summer signal will be passed through the parallel circuit 90. With the switch arm 53 connected to terminal 58 a signal is applied to solenoid coil 67 of the solenoid valve 66. This in turn will activate the solenoid valve to position valve section 69 of the valve to operate. The pump 70 will be in communication with the conduits 91, 92 and 93 and apply pressurized fluid on the rod end of the cylinders 23 and 24. The base end of the cylinders will be in communication with the reservoir 71 through the conduits 94, 95 and 96. With the solenoid valve in this position the rock arms 18 and 19 will rotate to lift the draft arms 12 and 13 to raise the implement.

When the slippage signal from the comparator 42 equals that of the monitor 40 no signal will be passed through circuit 90 to actuate the solenoid valve 66. At this point the solenoid valve automatically returns to neutral in response to the spring 73.

When the signal from the monitor 40 is at least 10% greater than the signal coming from the comparator 42, a signal is transmitted through the parallel circuit 90 through the selective switch 100 to the solenoid coil 67 to position the section 74 in operation. In other words, the valve moves in the right hand direction and pressurized fluid from pump 70 passes through conduit 96, 94 and 95 to the base end of the cylinders 23 and 24. The rod ends of the cylinders are in communication through conduits 92, 93 and 91 to the reservoir and the draft arms will be lowered as the cylinders 23 and 24 are extended. This operation continues until the signals again equalize in the summer 76 at which time the solenoid valve again returns to a neutral position in response to the operation of the spring 73 since the coil 67 is de-energized.

When selector switch 100 is moved so that the contact arm 53 engages terminal 57 solenoid valve 66 is in the neutral position as shown in FIG. 3. As the contact arm 53 is positioned to contact terminal 47 and contact arm 54 is positioned on terminal 61 the solenoid valve will move to the left hand position and raise the draft arms so long as the valve is in this position until the implement is raised to the transport position. When the contact arm 53 contacts terminal 60 contact arm 54 contacts terminal 56 the reverse flow of current is produced causing the solenoid valve to lower the draft arms since the solenoid valve will move the valve in the right hand direction causing pressurized fluid to flow from the pump 70 through the valve to the base end of the cylinders thereby extending the cylinders 23 and 24.

The battery 43 provides energization for the manual operation and the master power switch 44 controls the power for the amplifiers to energize the circuits. The manual control is provided so that the operator can raise or lower the implement. The percentage of slip monitor is also a manual adjustment which is normally preset in the 11% to 15% range.

The embodiments of the invention in which an exclusive property or privilege is claimed are defined as follows:

1. A tractor comprising, a three point hitch adapted for connection to an implement, a pair of lower draft arms in said three point hitch, a hydraulic weight distribution system including hydraulic actuators connected to said lower draft arms of said three point hitch for controlling implement position, at least one drive wheel, a first signal generator connected to said drive wheel for sensing rotation of said drive wheel, at least one freely rotatable wheel, a second signal generator connected to said freely rotatable wheel for sensing rotation of said freely rotatable wheel, and electrical circuit including said signal generators, a signal comparator for comparing signals from said signal generators generating a difference signal, a second signal comparator for comparing said difference signal with the signal from said signal generator connected to said drive wheel for generating a ratio signal proportional to and indicating the percentage of wheel slippage of said drive wheel, a reference signal generator for generating a reference signal indicative of desired percentage of wheel slippage, a signal summer for summing the ratio signal and the reference signal and generating a control signal, an electrically operated control valve in said hydraulic weight distribution system connected to said actuators for distributing the weight of said tractor to and from said drive wheel by controlling said actuators, conductors between said signal summer and electrically operated control valve to transmit said control signal to said electrically operated control valve to thereby control said valve for distribution of the weight of said tractor to and from said drive wheel responsive to deviation of actual percentage of drive wheel slippage from the desired percentage of drive wheel slippage.

2. A tractor as set forth in claim 1 wherein said drive wheel defines a rear drive wheel for driving said tractor, said freely rotatable wheel defines a front wheel of said tractor.

3. A tractor as set forth in claim 1 including a pair of front wheels, a signal generator connected to sense rotation of the first front wheel, a signal generator connected to sense wheel rotation of the second front wheel, a circuit including means connecting said first and second signal generators to generate an average signal.

4. A tractor as set forth in claim 1 including, a propeller shaft for driving a pair of rear wheels, means connecting said second signal generator to said propeller shaft for sensing average wheel rotation of said rear wheels.

5. A tractor as set forth in claim 1 including two freely rotatable wheels, said signal generator including means for sensing the average wheel rotation of said two freely rotatable wheels, a pair of rear wheels, a propeller shaft driving said rear wheels, said second signal generator connected to said propeller shaft for sensing the average rotation of said rear wheels to thereby sense rear wheel slippage.

6. A tractor as set forth in claim 1 including a manually adjustable signal generator for generating the reference wheel slip signal for presetting the predetermined wheel slippage range of the drive wheel of said tractor.

7. A tractor as set forth in claim 1 including a limit switch in said electrical circuit limiting the lowest position of one of said lower draft arms of said three point hitch.

8. A tractor as set forth in claim 1 including a signal transmission means in said electrical circuit including a diode and a switch for transmitting a signal to said electrically operated valve, mechanical means operating said switch for limiting the weight transfer and low position of said three point hitch by providing unidirectional signal transmission when said switch is open.

9. A tractor as set forth in claim 1 including a manually operated signal circuit connected to said electrically operated valve for selectively operating said hydraulic weight distribution system.

10. A tractor as set forth in claim 1 including a pair of front wheels including said freely rotatable wheel, said second signal generator generating a signal responsive to the average rate of rotation of said front wheels, a pair of rear drive wheels including said one drive wheel, said first signal generator generating a signal responsive to the average rate of wheel rotation of said rear wheels.

* * * * *